United States Patent
Alessi

[15] 3,672,061
[45] June 27, 1972

[54] DEVICE FOR MEASURING THE AMOUNT OF FLUID IN BOTTLES

[72] Inventor: Frank A. Alessi, 1558 Boulevard, Lorraine SW, Atlanta, Ga. 30311

[22] Filed: March 25, 1970

[21] Appl. No.: 24,466

[52] U.S. Cl. .............................. 33/169 R, 33/143 J, 33/111, 33/126.7 R, 73/428
[51] Int. Cl. .......................................................... G01b 5/00
[58] Field of Search .................... 33/137, 169, 2 H, 126.7 R, 33/107, 111; 73/428

[56] References Cited

UNITED STATES PATENTS

| | | | |
|---|---|---|---|
| 3,088,208 | 5/1963 | Mitchell | 33/111 X |
| 3,313,030 | 4/1967 | Heys | 33/169 R |
| 2,507,684 | 5/1950 | Smith | 33/137 |
| 2,720,114 | 10/1955 | Truffa | 73/428 |

FOREIGN PATENTS OR APPLICATIONS

| | | | |
|---|---|---|---|
| 5,263 | 0/1905 | Great Britain | 73/428 |
| 190,566 | 6/1922 | Great Britain | 73/428 |
| 475,796 | 8/1951 | Canada | 33/126.7 R |

Primary Examiner—William D. Martin, Jr.
Attorney—Newton, Hopkins & Ormsby

[57] ABSTRACT

This invention relates to a device for measuring the amount of fluid remaining in a transparent container, such as a bottle by positioning a scribed line on a slidable pointer in alignment with the fluid level in the container. The quantity of fluid remaining is read directly on a scale. A separate scale is calibrated for each differently shaped container in terms of the liquid units desired to be measured, such as 1¼ ounce 'jiggers.' The scale is printed on a standard size insert which is mounted on a recess on the body of the device. The measuring device may be affixed directly to the container by means of a double-sided tape. Alternately, the device may be affixed to any vertical surface, and the container to be measured placed in a measuring relationship with the device.

3 Claims, 9 Drawing Figures

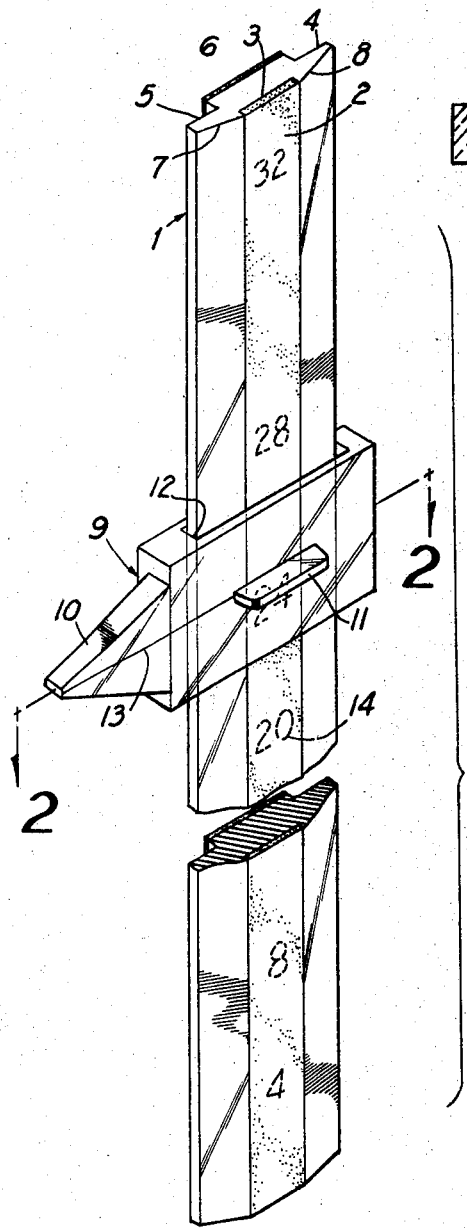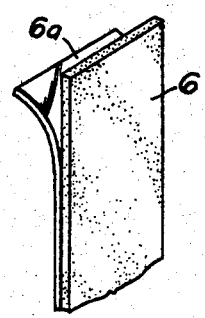

3,672,061

DEVICE FOR MEASURING THE AMOUNT OF FLUID IN BOTTLES

BACKGROUND OF THE INVENTION

This invention relates to the dispensing of liquids from transparent containers, particularly the broad group of liquids comprising alcoholic beverages which are necessarily bottled in a large number of sizes and shapes of containers, and wherein it is required to accurately measure the remaining quantity of liquid at frequent intervals. Hertofore, it has been largely a matter of estimating (or guessing) the amount of liquid remaining in each of a myriad of differently shaped containers at the close of each days operation.

U.S. Pat. No. 3,311,267, entitled, "Measuring Attachment for Beer Keg or the Like" reveals a device for measuring the amount of liquid contained at any particular time between the initial dispensing and exhausting of the contents of such a keg. This invention is essentially a sight gauge with one end adapted to be placed in communication with the pressure line which extends into the upper end of a beer keg, and the other end of the gauge is adapted to be connected in valved communication with the dispensing tap valve. While this device is obviously suitable for use on a pressurized container, it would not be adaptable for use in measuring the contents remaining in a plurality of shapes of bottle-type containers as normally utilized in a bar or such other place.

U.S. Pat. No. 3,241,368, entitled, "Apparatus and Method for Measuring the Level of a Liquid" reveals another type of apparatus for measuring the level of a liquid in a container. In this invention, the liquid to be measured is not measured directly with reference to the liquid level line, but is indirectly measured by measuring the acoustical resonance of a cavity directly above the liquid to determine the level of the liquid in the container. The patent points out that direct measurement systems usually employ a sensing or transducer element immersed in the liquid, and that variables such as liquid temperature, viscosity, dielectric constant, specific gravity, etc., must be taken into account to provide an accurate reading of the liquid contents of the container. Although the apparatus of this invention does in fact measure the level of a liquid in a container, it was obviously not intended for the uses as visualized in the present invention.

OBJECTS OF THE INVENTION

It is therefore a primary object of this invention to provide a device for expeditiously and accurately measuring the amount of liquid remaining in a transparent container.

It is a further object of this invention to provide a device which can be utilized to measure the amount of liquid remaining in a transparent container, regardless of the shape or size of the container.

Another object of this invention is to provide a measuring device which may be directly affixed to the container and utilized in conjunction thereof, or which may alternately be affixed to a vertical surface and utilized separately but in conjunction with a container, the contents of which are to be measured.

A further object of this invention is to provide a method of accurately measuring the amount of liquid remaining in any one of a plurality of different shaped containers.

A still further object of this invention is to provide a separate measuring scale for each distinct container to be measured, the measuring divisions of which are calibrated in terms of units customarily used to measure alcoholic beverages. The scale is printed on a standard size panel which is insertable in a recess in the body of the measuring device.

Other objects and advantages in the details of construction will be apparent after reading the following description with reference to the accompanying drawings wherein like reference characters have been used to identify the same parts throughout the drawings, and wherein:

DESCRIPTION OF THE DRAWINGS

FIG. 1 is a perspective view of the measuring device in its fully assembled configuration, showing the transparent slidable pointer and a scribed line;

FIG. 2 is a lateral cross section of the measuring device, as indicated by the line 2—2 in FIG. 1;

FIG. 3 is an exploded perspective view of the measuring device, as derived from FIG. 1, showing the components which are subsequently assembled permanently to the transparent body of the device;

FIG. 4 is a partially exploded perspective view of the double-sided tape before being assembled to the body of the device;

DESCRIPTION OF ILLUSTRATIVE EMBODIMENTS

Figure 7:
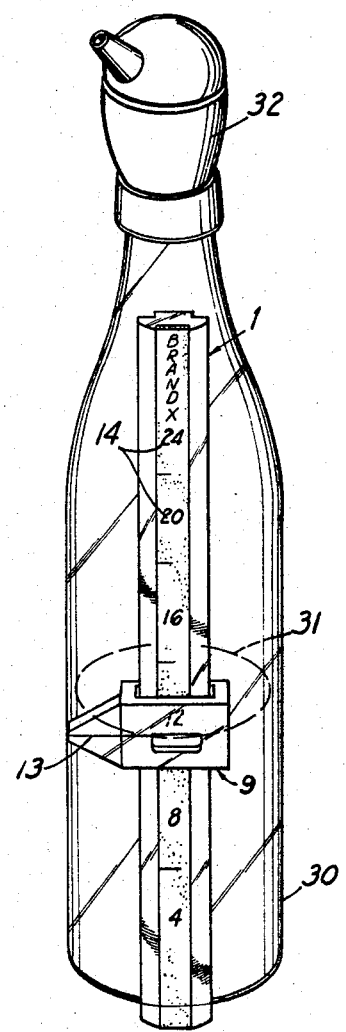
FIG. 7 shows the measuring device of the present invention as utilized in a first method of measuring the liquid remaining in a transparent container, wherein the device is affixed directly to the container.
Figure 8:
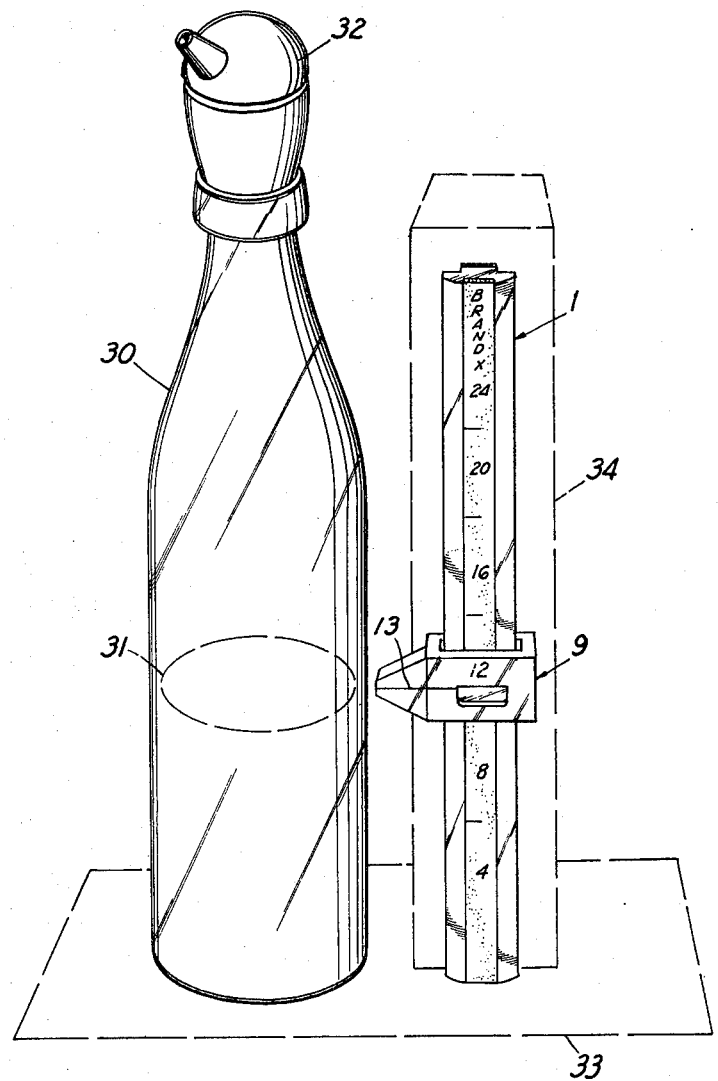
FIG. 8 shows the measuring device of the present invention as utilized in a second method of measuring the liquid remaining in a tranSparent container, wherein the device is affixed to a vertical surface other than the container.

The present invention provides a simple, economically fabricated, and easy to use device for measuring accurately the liquid contents remaining in a particular transparent container. In an establishment where alcoholic beverages are dispensed it is vitally important that an accurate account be kept of all bottled beverages, particularly in view of the fact that sizeable inventories of this type involve a large investment, are prone to considerable 'drippage losses' and easily misappropriated. These losses usually occur singularly in small minute quantities, but quickly accumulate into large quantities of liquid, and this considerable unaccountable losses. It is well known that virtually every business which dispenses alcoholic beverages has established procedures which relate to the quantity of liquor to be dispensed for and into each type of liquid preparation. In fact, in many cases, special automatic dispensing devices are utilized, which usually fit into the top of the bottle, and which when turned upside down automatically dispense a specific measure of the liquid. For example, a rather standard quantity of liquor to be dispensed for use in a broad category of mixed beverages is 1 ¼ ounces, and the aforementioned dispenser is readily available to automatically dispense 1 ¼ ounce units of a beverage. A typical automatic dispensing device 32 is shown in FIGS. 7 and 8.

Whether or not the automatic dispensing devices are utilized, it would be significantly advantageous if for purposed of easily measuring and accounting for the amount of liquid remaining in the bottle, a measuring device were available which would accurately measure the number of 1 ¼ ounce units remaining in a specific bottle, regardless of the shape or size of the bottle.

The present invention provides such a device. Please refer now particularly to FIGS. 1 through 4 in connection with the following detailed description of the measuring device, wherein an elongated member 1 forms the body of the device. Elongated Member 1 is preferably formed of a suitable clear or transparent plastic material, but could be formed from any translucent or opaque material other than plastic and still retain its operative characteristics. The elongated member 1 includes a recess 3 for receiving a measuring scale 2. Scale 2 is selectively provided with a particular indicating scale for measuring the contents in a specific size of transparent container, as will be described herein below. The basic construction of the elongated member 1 is best shown in FIG. 3 wherein cutouts 4 and 5 are provided on the rear panel of the body forming thereby a suitably raised mounting surface for double-sided tape 6. On either side of recess 3, front surfaces 7 and 8 are angularly sloped towards the outside edges of member 1. Double-sided tape 6, which is applied to the rear mounting surface of body member 1, may be any conventional tape which is provided with double-sided peel-off coverings so that side 6 may, during fabrication, be permanently affixed to body member 1, while the adherable side 6a of the tape may be left covered until the device is to be affixed to a container or other surface. Measuring scale 2 is fabricated separately so as to be fitted into recess 3 or body member 1. This is done so that scale 2 may be printed with an individually calibrated scale for measuring the liquid contents in a plurality of specifically sized containers, or bottles. It is obvious therefore, that a different scale 2 would be required for every differently shaped transparent container to be measured. This provides for considerable flexibility in the design of the measuring device, wherein measuring scale 2 is the only component of the device that must necessarily be printed with a plurality of different scales, but otherwise is of the same constructional size for all of the various models of the measuring device. Numbers 14, shown in the drawings for illustrative purposes, are typically printed on scale 2 in accordance with the actual heights of measured quantities of specific containers.

Sliding pointer 9, as shown in FIGS. 1 and 2, is molded from similar transparent material as body member 1, and is slidable along the length of member 1, and may also be easily removed for assembly or disassembly purposes. Pointer 9, generally a rectangularly shaped transparent form, is configured for a snug-fitting but slidable relationship with member 1 by a cavity 12. One side of pointer 9 is terminated in a triangularly shaped indicator 10. A scribed line 13 extends horizontally across the face of slidable pointer 9, and will be described in greater detail later in conjunction with the liquid measuring characteristics of the measuring device. Tab 11, which protrudes from the face of pointer 9 as shown in the drawings, is provided for use in conveniently raising and lowering the slidable pointer 9 on the body member 1. FIG. 2, which is a cross section of body member 1 and slidable pointer 9, shows clearly the slidable relationship of the pointer and the body member 1. It may be noted at this time that, providing the body member 1 and pointer 9 are molded from a transparent material, scribed line 13 will clearly and visibly relate to the numbers 14 which are printed on scale 2, regardless of the vertical orientation of pointer 9.

Figure 5:
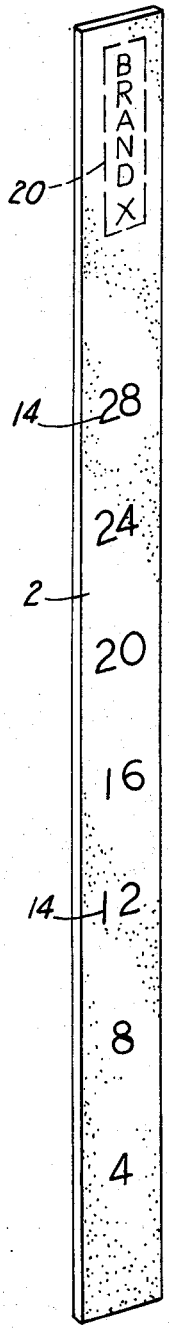
FIG. 5 is a perspective view of a typical measuring scale as utilized on the measuring device, before being assembled to the body of the device.

Measuring scale 2, which was described earlier from the viewpoint of a fitting relationship into recess 3 in body member 1, will now be further described with reference to the numbers 14. FIG. 5 shows scale 2 with numbers 14, (numbered 4 through 28) printed or marked thereon. In addition, block 20 in FIG. 5 shows a typical 'brand X,' which would be a definitive description of the specific container which the scale thereof was intended to provide measurements for. In the present instance, scale numbers 4 through 28 (FIG. 5) which are arranged vertically in an ascending manner, are the number of 1 ¼ ounce units. It was previously mentioned that a standard quantity of liquor normally used in a wide variety of mixed beverages is 1 ¼ ounces, and this unit of measure is widely used in the calculation of units of liquor remaining in a container. Therefore, in the above situation, scale 2 has been 'calibrated' for use on a container of 'brand X' liquid for measuring the number of 1 ¼ ounce units of liquid remaining in the container. It will of course, be obvious to persons skilled in the art that the units of measure which form the basis for numbers 14 on scale 2 may be any arithmetical unit of measure other than 1 ¼ ounce units, which might be more convenient for a particular measuring requirement.

Figure 6A:
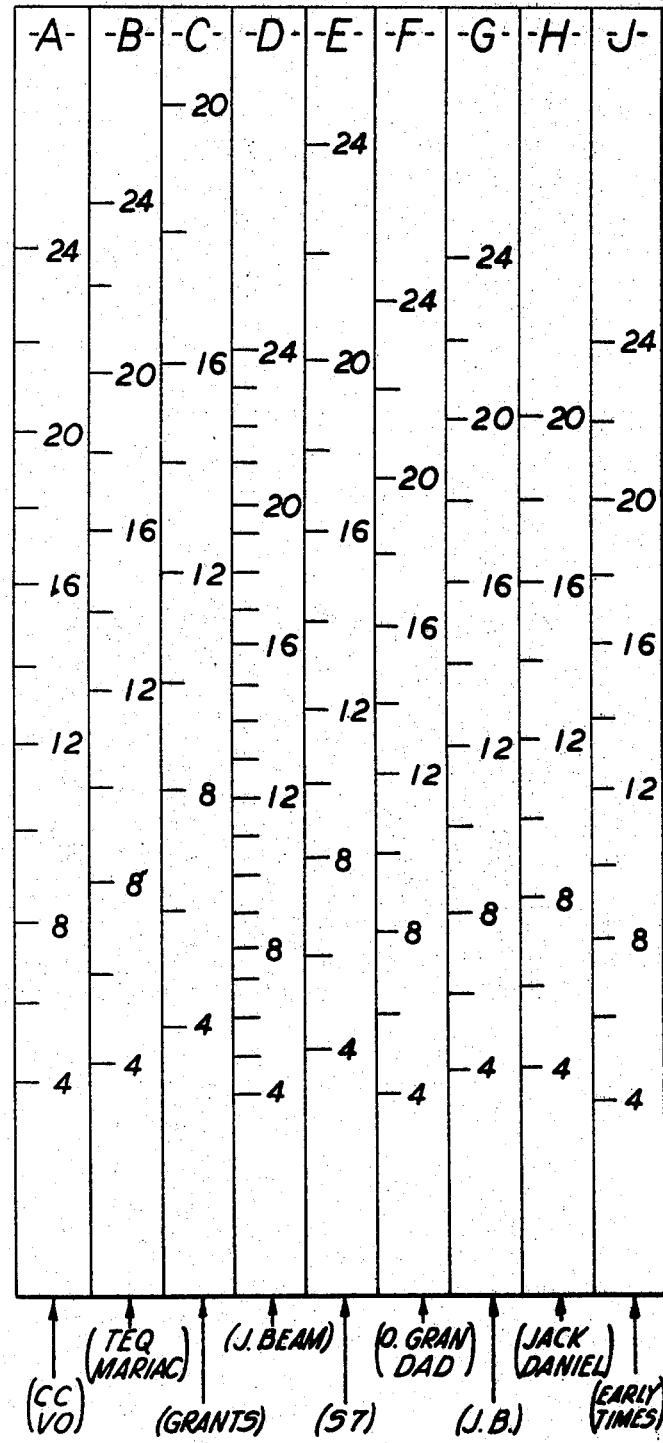
FIG. 6 is a chart which shows graphically a plurality of individual measuring scales of the type shown in FIG. 5, and portraying the widely varying liquid levels for a given container height of a large number of liquid containers, each of which is shaped differently, both externally and internally.
Figure 6B:
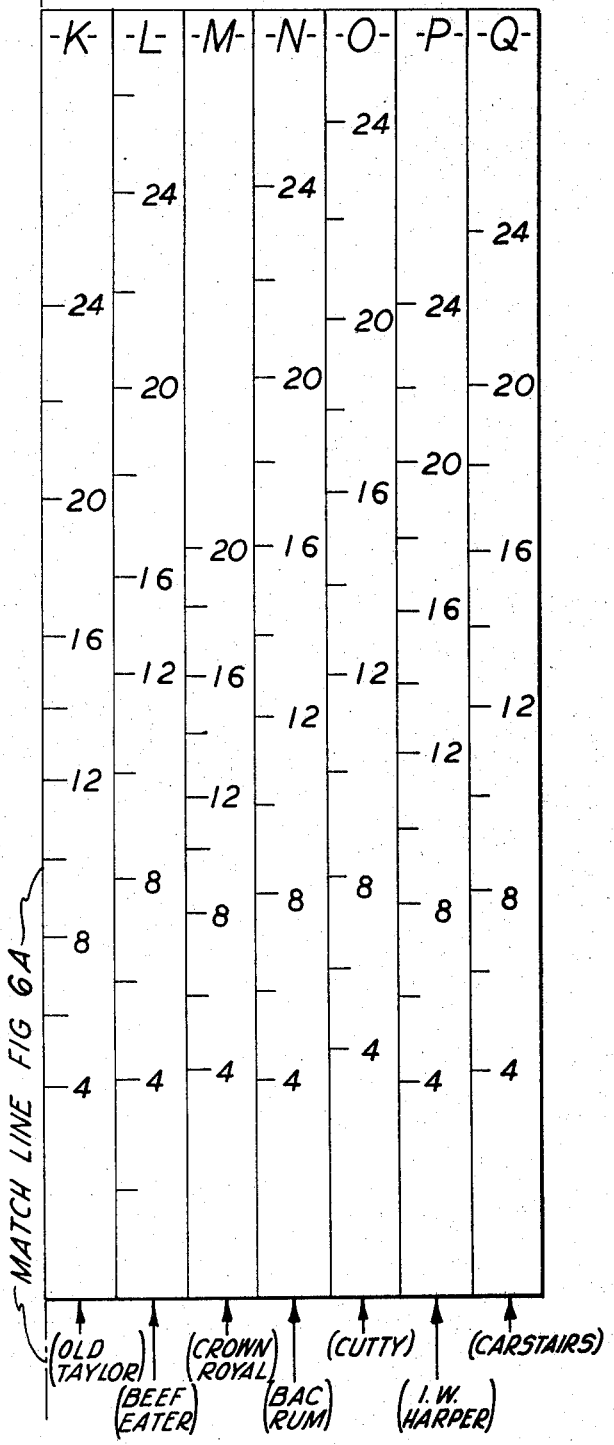

FIG. 6 is a tabular series of individual measuring scales which show a measuring relationship of 'brands A through R' in a manner similar to the discussion above with respect to measuring scale 2. In each 'brand' in FIG. 6 the vertical measurements have been calculated for a particular type of transparent container to show the number of 1 ¼ ounce units of liquid remaining in that container. It will now be apparent that if any particular 'brand' scale is extracted from FIG. 6, printed on the body of measuring scale 2, and the 'brand' label entered in the space provided in block 20, then that scale 2, so printed, could be permanently inserted into recess 3 on body member 1, the result being a measuring device fabricated specifically for measuring the amount of liquid remaining in a transparent container of the 'brand' selected.

METHOD OF OPERATION

The operational utilization of the measuring device of the present invention is best shown by reference to FIGS. 7 and 8 and the following description. FIG. 7 shows a transparent container 30 which in the illustrative embodiment is a bottle of "-brand X" liquor. As shown in FIG. 7 the bottle of 'brand X' liquor is prepared for use in a bar or tavern by having inserted into the open end of the bottle an automatic dispensing device 32. Upon turning the bottle over, the dispensing device 32 will permit the free flow of exactly 1 ¼ bottle for the first time, the measuring device, comprising body member and pointer 9 was affixed vertically to the bottle by the use of the double-sided tape portion 6a. When so affixed to the bottle, the bottom of the measuring device was mounted with the bottom of the device being exactly even with the bottom of the bottle. The measuring device therefore in this instance becomes integral with the bottle during the use of that particular bottle of 'brand X' liquid. It should be noted that the measuring device shown in FIG. 7 is suitably marked 'brand X' to indicate that measuring device was designed to measure correctly only the contents of a 'brand X' bottle. The quantity of liquid 31 remaining in the bottle is now measured accurately in units of 1 ¼ ounces by manually adjusting the sliding pointer 9 until the scribed line 13 is even with the level of the liquid. The number 14 (or fraction thereof) on measuring scale 2 which is directly under scribed line 13 is now read, and thus the amount of liquid remaining in the bottle can be read directly, in this case, in units of 1 ¼ ounces.

Referring now particularly to FIG. 8, it will be observed that in this illustrative embodiment the liquid measuring device is not affixed directly to the bottle, but is rather attached to a vertically oriented surface 34. Surface 34 may be any suitable or convenient surface which is capable of receiving a transparent bottle in perpendicular relationship to the bottom surface of the measuring device. In FIG. 8 the horizontal surface is surface 33. In this embodiment, the bottle 30, with automatic dispenser 32, may be utilized in any convenient manner during the daily bar operation, and when it is desired to measure the amount of liquid of 'brand X' in the bottle, the bottle is placed in a measuring relationship on surface 33 adjacent to the measuring device. Slidable pointer 9 is moved up or down, as the level of liquid in the bottle indicates, until the scribed line 13 is opposite the level of the liquid in the bottle, as shown in FIG. 8. It should be noted at this time that it is important, in the interests of accurate accounting, that the bottle to be measured be placed in a measuring relationship with the correct measuring device; i.e., the measuring scale 2 on the measuring device must be the one that is calibrated for the particular bottle being measured. In the same manner as in the previous embodiment, the amount of 1 ¼ ounce units remaining in the bottle being measured is read directly from the scale, as shown in FIG. 8. An advantage inherent in this embodiment is that the measuring device need not necessarily be affixed to the bottle while it is in use, and therefore need not be removed from the bottle when a new bottle of the same brand is replaced in the bar. Also, the measuring device can in this manner be placed in any convenient place in the bar, and out of sight of customers if it is so desired.

It now becomes apparent that the illustrative embodiment of the measuring device and method of operation is capable of obtaining the above stated objects and advantages. It is obvious that those skilled in the art may make modifications in the details of construction without departing from the spirit of the invention which is to be limited only by the scope of the appended claims.

What is claimed is:

1. A device for measuring the quantity of fluid in a transparent container comprising a flat elongated member having a longitudinal recess extending throughout its length on one of its faces and having cutouts extending along the sides of its opposite face to provide a raised mounting surface thereon, a tape covering said mounting surface said tape having an adhesive coating adapted to secure said body to a surface, an indicating scale removably mounted in said recess and calibrated to indicate the quantity of fluid in a container at a plurality of spaced points; and a flat slide member snugly but slidably embracing said elongated member said slide member being formed of transparent material and having a front portion movable over said scale, end portions slidable along the edges of said elongated member, and rear portions extending inwardly from said end portions and slidably fitting in said cutouts, said rear portions being of a thickness less than the depth of the cutouts so that they lie below said mounting surface, said slide member having a scribed line extending in a direction transverse to the length of said elongated member.

2. A device as in claim 1 wherein said slide member further includes a triangular indicator extending from one of its ends with the vertex of the triangle lying on said scribed line.

3. A device as in claim 2 wherein said slide member is provided with a tab projecting from its front face with one edge of the tab lying along said scribed line.

* * * * *